United States Patent [19]

Adams

[11] Patent Number: 4,625,624
[45] Date of Patent: Dec. 2, 1986

[54] POWER ASSISTED STEERING SYSTEM AND A STEERING ASSEMBLY FOR SUCH A SYSTEM

[75] Inventor: Frederick J. Adams, Clevedon, United Kingdom

[73] Assignee: TRW Cam Gears Limited, Hertfordshire, United Kingdom

[21] Appl. No.: 677,063

[22] Filed: Nov. 30, 1984

[30] Foreign Application Priority Data

Dec. 9, 1983 [GB] United Kingdom ............... 8332934

[51] Int. Cl.$^4$ .............................................. F15B 13/06
[52] U.S. Cl. .................................. 91/375 A; 91/523; 91/524; 91/510; 180/133
[58] Field of Search ............. 91/521, 523, 524, 375 A, 91/375 R, 510, 530; 180/133, 146, 147

[56] References Cited

U.S. PATENT DOCUMENTS 4,186,818 2/1980 Jablonsky ........................ 180/133
4,189,024 2/1980 Jablonsky ........................ 180/133
4,368,794 1/1983 Elser et al. ....................... 91/523

Primary Examiner—Robert E. Garrett
Assistant Examiner—Mark A. Williamson
Attorney, Agent, or Firm—Yount & Tarolli

[57] ABSTRACT

A power assisted steering system and a steering assembly for such a system. The steering assembly has a steering output comprising an arm 6 displaceable through a toothed sector 7 by a racked piston nut 3 drivingly engaging a worm shaft 7 rotatable by a steering input shaft 12. The piston 3 and its cylinder 2 provides a first servomotor for power assisting the steering output. The first servomotor is powered by a first hydraulic system 16 comprising a rotary valve 10 which is responsive to the steering input to control fluid pressure to the first servomotor. The steering system also includes a second hydraulic system 25 comprising an axially responsive spool valve 21 which controls fluid pressure to operate a second servomotor 28 coupled to the steering output arm 6. The rotary and axially responsive valves 10 and 21 are axially coupled together by the shaft 7 which is axially displaceable to control operation of the valve 21. Axial biasing springs 34 and 35 axially spring load the shaft 7 to a neutral condition for the valve 21. During use of the steering assembly the resistance to displacement of the piston 3 by the drive imparted thereto from the worm shaft 7 serves to provide a reaction on the shaft 7 which displaces the shaft against its spring biasing to operate the valve 21 and provide power assistance through the system 25 and ram 28. This power assistance may be effected prior to, simultaneously with or subsequent to power assistance provided by the servomotor comprising the piston 3 powered by operation of the rotary valve and from the hydraulic system 16. If required, both hydraulic systems 16 and 25 can be used to power a single and common servomotor.

14 Claims, 1 Drawing Figure

U.S. Patent  Dec. 2, 1986  4,625,624
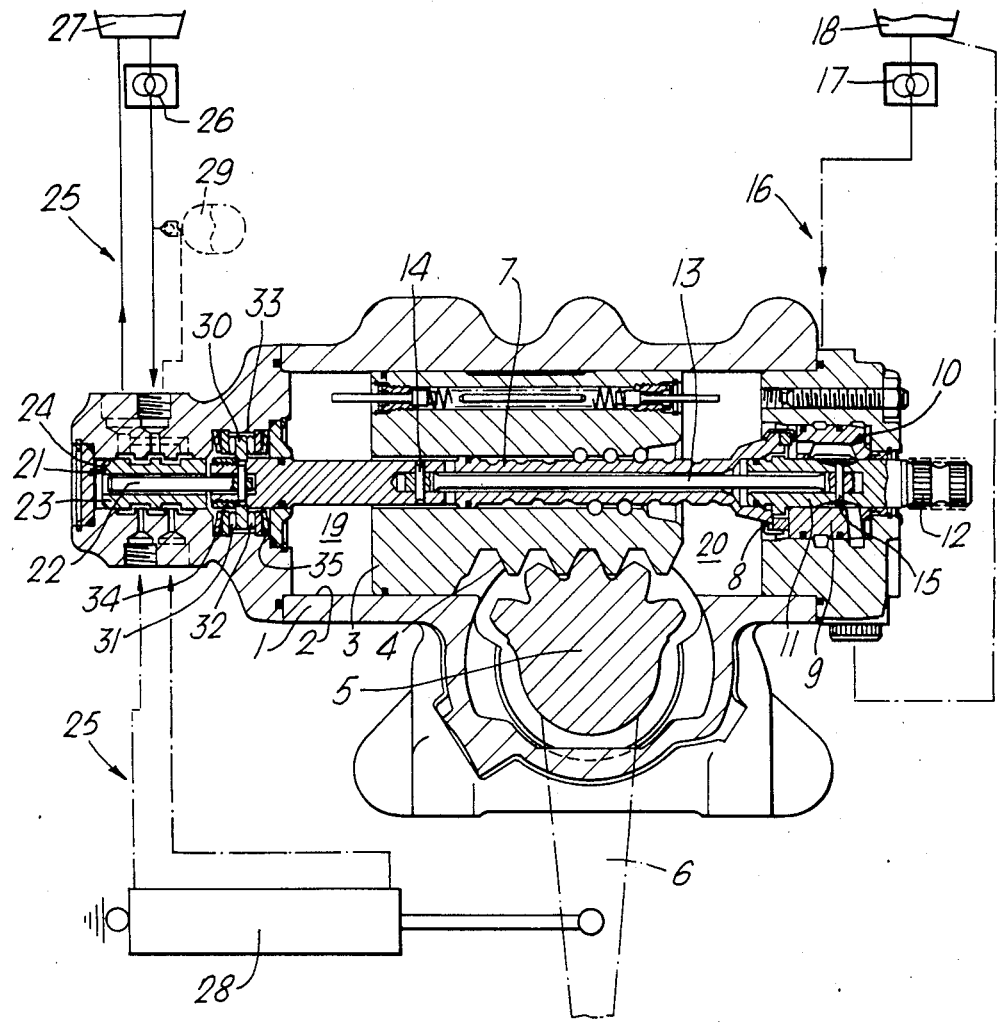

POWER ASSISTED STEERING SYSTEM AND A STEERING ASSEMBLY FOR SUCH A SYSTEM

TECHNICAL FIELD AND BACKGROUND ART

This invention relates to a power assisted steering system comprising two hydraulic systems each of which is independently controlled by valve means to provide power assistance through servo motor means associated with a steering assembly or unit in the system. Such a steering system having primary and secondary hydraulic system or circuit parts is well known for motor vehicles and despite the additional manufacturing costs (as compared with single hydraulic circuit power steering) has several advantages, notably that if power assistance for one system part fails the other is available to ensure that the vehicle can be steered with assistance and that if there is encountered a heavy resistance to a steering maneuver, the valves may react in response to the steering input to provide power assistance from both hydraulic circuits in an attempt to overcome the resistance. The valves for controlling the power assistance which is available from the primary and secondary hydraulic circuits are usually carried within the steering assembly or gear and the cost of their inclusion is a considerable proportion of the overall cost of the assembly. By way of example, U.K. Pat. No. 1,597,057 discloses a power assisted steering system with two hydraulic circuits, the valve means for the primary circuit being mounted in a gear housing while the valve means for the secondary circuit is mounted in a piston which forms part of the servo motor means and in each case the valve means is of a relatively complicated structure which would be relatively expensive to manufacture, assemble and service.

It is an object of the present invention to provide a power assisted steering system having two hydraulic system parts and associated valves of the kind discussed above but which lends itself to relatively inexpensive manufacture and may be relatively simple to assemble and in operation.

STATEMENT OF INVENTION AND ADVANTAGES

According to the present invention there is provided a power assisted steering system comprising a steering assembly providing a steering output in response to a steering input torque; servomotor means for providing power assistance to the steering output; a first hydraulic system part comprising a rotary valve which is responsive to the steering input torque and controls fluid pressure from that system part to the servomotor means and power assistance derived from the first system part; a second hydraulic system part independent of said first part and comprising an axially responsive valve which controls fluid pressure from the second system part to the servomotor means and power assistance derived from the second system part, and wherein the rotary valve and axially responsive valve are coupled together by axially extending shaft means which is spring biased axially to a neutral condition and is axially displaceable against its spring biasing from said neutral condition in response to a reaction imparted thereby as a result of an input torque being applied to operate the rotary valve, said axial displacement of the shaft means effecting in operation of the axially responsive valve for controlling the power assistance provided by the second system part with the servomotor means.

Further according to the present invention there is provided a steering assembly for a power assisted steering system as specified in the immediately preceding paragraph which assembly comprises a housing within which are mounted steering gear components one of which provides a steering output in response to rotation of an input shaft of the assembly by application of a steering input torque and wherein co-axially mounted in the housing are a rotary valve which is responsive to rotation of the input shaft for controlling the first hydraulic system part, an axially responsive valve for controlling the second hydraulic system part and axially extending shaft means coupling together said rotary valve and said axially responsive valve, said shaft means being axially displaceable and axially spring biased relative to the housing and to a neutral condition of the axially responsive valve, and wherein said shaft means is axially displaceable to control operation of said axially responsive valve in response to an axial reaction applied thereto as a result of resistance to the transmission of a steering force from the input shaft to the steering output and between said steering gear components.

By the present invention the rotary and axial valves can be of substantially conventional structures as are well known in the art of vehicle steering gears thereby alleviating the cost of special purpose machining for the valvery. For example, the rotary valve may comprise a valve sleeve member and a rotary member which are rotationally biased relative to each other and to a neutral condition so that during the application of a steering input torque these members are displaced relative to each other against their rotational biasing to control power assistance from the first hydraulic system part; the axially responsive valve may simply comprise a spool axially slidable in a cylinder so that displacement of the spool (which displacement relative to the cylinder can be axial and/or rotational) in response to axial displacement of the shaft means controls power assistance from the second hydraulic system part, these axial and rotary valves are preferably co-axial in the housing of the assembly and coupled together by the shaft means so that the displacement of the shaft means in response to a steering input being applied to operate the rotary valve is applied to operate the axially responsive valve to control the second system part. The valve member which controls fluid flow through an axial valve is preferably in the form of a spool which is axially displaceable with the shaft means to provide said control although, as mentioned above, that valve member may be rotated in response to axial displacement of the shaft means to provide the required control.

During operation of the rotary valve in response to a steering input torque and the displacement of the shaft means, the axially responsive valve may be arranged to provide power assistance from the second hydraulic system part and with the servomotor means prior to, simultaneously with, or subsequent to, the provision of power assistance from the first system part with the servomotor means under control of the rotary valve. Preferably however power assistance during normal use of the steering system is provided solely from the first hydraulic system part while the second system part is available as a back-up which becomes available when heavy resistance to a steering maneuver is encountered or if the first system part fails.

Preferably the shaft means is associated with the servomotor means so that it is axially displaceable to control the axially responsive valve in response to a reaction from the servomotor means during operation of said means under the power assistance provided by the first system part.

The sensitivity of the axially responsive valve may largely be determined by the axial biasing forces to which the shaft means is subjected so that if the shaft means is heavily spring biased to its neutral condition the second hydraulic system part may only become effective to provide power assistance when encountering extremely heavy resistance to steering; however, with relatively light biasing on the shaft means it is possible for the shaft means to be axially displaced sufficiently to control the axially responsive valve in response to an input torque on the rotary valve, so that, as aforementioned, power assistance is provided from the second hydraulic system before or simultaneously with the rotary valve being adjusted sufficiently to apply power assistance from the first hydraulic system part. The shaft means may be rotatable through the rotary valve and in response to the steering input torque which is applied to the rotary valve and serve to drive a component in the gear assembly from which component the steering output is derived: in such a case the shaft means may be axially displaceable to control the axially responsive valve in response to the reaction which results from the resistance to the drive which is applied from the aforementioned component. Preferably the shaft means comprises a worm shaft and the component comprises a nut which drivingly engages the worm shaft to be displaced axially for providing a steering output in response to rotation of that shaft; the nut may be in the form of a piston which forms part of a double acting piston and cylinder device for the servomotor means. Preferably the servomotor means comprises a first servomotor associated with the first system part and a second servomotor, independent of the first servomotor, associated with the second system part. The two servomotors will usually be in the form of double acting piston and cylinder devices and preferably the first servo motor comprises the piston on the worm shaft as aforementioned while the second servomotor is in the form of a ram appropriately coupled in the steering assembly to provide assistance to movement of the steering output.

DRAWING

One embodiment of a power assisted steering system constructed in accordance with the present invention will now be described, by way of example only, with reference to the accompanying illustrative drawing which shows a section through a rack and sector type power assisted steering assembly with diagrammatically indicated first and second hydraulic system parts for the assembly.

DETAILED DESCRIPTION OF DRAWING

The steering assembly incorporated in the system illustrated comprises a housing 1 having a cylinder 2 within which is axially slidable a tubular piston 3. The piston 3 has a rack 4 engaging with a toothed sector 5 mounted for rotation in the housing 1 and carrying (external of the housing) an arm 6 which provides a steering output for the system. Axial displacement of the piston 3 causes arcuate displacement of the arm 6 through the co-operating rack 4 and sector teeth for effecting a steering maneuver in conventional manner. The piston 3 is in the form of a nut which engages in known manner through a recirculating ball mechanism with a tubular worm shaft 7, one end of which is coupled at 8 for rotation with a sleeve 9 of a rotary valve 10. The valve 10 may be regarded as substantially conventional in structure as is known for power steering units and comprises a rotor 11 within the sleeve 9 and formed on an input shaft 12 which extends from the housing. The rotor 11 is axially rotatable relative to the sleeve 9 and is coupled to the worm shaft 7 by a torque rod 13 which extends through the bore of the shaft 7 and is pinned at 14 and 15 respectively to the shaft 7 and rotor 11. The end of the worm shaft 7 remote from the rotary valve is rotatably mounted in the housing 1 and the steering assembly thus far described is well known in the power assisted steering art. Accordingly the rotary valve 10 has associated therewith an hydraulic system part 16 including an electric or engine driven pump 17 drawing fluid from a reservoir 18. The valve 10 will usually be of the open centre kind whereby in a neutral condition of the valve fluid from the pump 17 is circulated freely as indicated by the arrows in the hydraulic system to return to the reservoir. When a steering maneuver is to be effected the torque applied during such a maneuver imparts a rotational movement to the input shaft 12 which torque is transmitted through the rod 13 to rotate the worm shaft 7 and thereby drive the piston 3. The resistance to rotation of the worm 7 (partly caused by friction of the recirculating balls but primarily by the resistance to displacement of the arm 6) will result in relative rotation between the rotor 11 and sleeve 9 (as permitted by twisting of the torque rod in known manner) and this relative displacement serves to vary the porting in the rotary valve 10 to direct fluid from the system part 16, as appropriate, to a servomotor comprising opposed chambers 19 and 20 for the piston 3 so that such fluid assists in displacing the piston axially in the same sense as that intended by rotation of the shaft 12 to effect the steering manoeuvre. As is well known with power steering gears of the kind so far described, the greater is the resistance to displacement of the arm 6 then the greater will be the relative rotation between the rotor 11 and sleeve 9 so that the porting of the rotary valve is adjusted to an extent whereby maximum fluid pressure is available to provide the power assistance for the steering maneuver.

During the aforementioned rotation of the worm 7 relative to the piston 3 and where there is resistance to axial displacement of the piston 3, it will be apparent that there is a reaction on the worm shaft 7 which is applied axially of that shaft and in accordance with the present invention this axial reaction is utilised to control operation of an axially responsive valve 21. For this purpose the worm shaft 7 is rotationally mounted in the housing 1 to be capable of limited axial displacement and is coupled by a pin 22 for axial displacement with a spool 23 of the valve 21.

The spool 23 is axially slidable in a spool cylinder 24 formed in the housing 1. The axial valve 21 is co-axial with the rotary valve 10 and forms part of a second hydraulic system 25 having an engine, electric or otherwise driven pump 26 drawing fluid from a reservoir 27 and circulating that fluid through the system 25 and under control of the valve 21 to a second servomotor in the form of a double acting piston and cylinder ram 28. The ram is coupled to the arm 6 for providing power assistance to displacement of the arm and thereby to the steering output. The valve 21 has a neutral condition in which the ram 28 is inoperative while displacement of the valve from its neutral condition by axial movement of the spool 23 relative to its cylinder 24 in one or the opposite senses of direction will control fluid flow to the ram 28 to provide the appropriate power assistance for displacing the arm 6; this principle of operation of the valve 21 is well known for power assisted steering gears and as such the necessary porting in the valve will be apparent to persons skilled in the art and need not be discussed in detail. However, it may be mentioned that the valve 21 may be of the open centre type where, in its neutral condition, fluid under pressure from the pump 26 circulates freely around the system or of the closed center type in which case an hydraulic reservoir indicated at 29 may be incorporated in the system 25 (in known manner) to provide an instant power reserve (for example as may be advisable where the pump 26 provides a low output being driven by a small electric motor). The spool 23 is axially biased to the neutral condition of the valve 21 by spring loading of the worm shaft 7 to which the spool is connected by the pin 22. In the illustrated embodiment the shaft 7 has secured thereto a radially extending flange or disc plate 30 on axially opposite faces of which engage thrust bearings 31 and 32. The flange 30 and thrust bearings are located in a counter bore 33 of the housing within which counter bore are mounted axial biasing springs 34 and 35 which are conveniently in the form of Belleville type spring washers. The springs 34 and 35 react, in one case against the housing and in the other case against a cover plate for the counter bore 33, and through the respective thrust bearings 31 and 32 on the flange 30 to bias the worm shaft 7 and spool 23 to a position corresponding to the neutral condition of the axial valve 21.

During use of the steering system and where resistance to axial displacement of the piston 3 is encountered as the input shaft 12 is rotated in response to a steering input torque as previously discussed, if the resistance to displacement of the piston 3 is sufficient, then the worm shaft 7 and spool 23 will be displaced axially in one or the opposite senses against the spring biasing 34 or 35. By this displacement the valve 21 is operated to control fluid flow as appropriate to power the ram 28 which assists in displacing the arm 6 and the steering output in a direction consistent with that required by rotation of the input shaft 12. The extent to which the power assistance from the second hydraulic system is available will largely be determined by the strength of the springs 34 and 35. The most likely use of the second hydraulic system 25 and ram 28 will be as a back-up to the first hydraulic system 16 and its associated servomotor formed by the piston 3 and cylinder 2 in the event that the first system 16 fails or additional power is required to overcome heavy resistance to the steering maneuver. Consequently, the spring forces 34 and 35 will usually be selected so that during normal use of the steering system power assistance is provided solely by the system 16 and fluid pressure on the piston 3 as determined by the rotary valve 10. If the resistance to displacement of the arm becomes sufficiently large then the input torque to the shaft 12 and resultant rotation of the worm 7 to drive the piston 3 will provide an axial reaction on the worm shaft to displace it against the appropriate spring biasing and cause the axial valve 21 to operate and power the ram 28 as appropriate to assist in the steering maneuver. As will be appreciated, once the resistance to the steering manoeuvre has been removed or overcome the spring biasing ensures that the valve 21 will revert to its neutral condition as will the rotary valve 10 in a conventional manner. The possibility is envisaged of having relatively light spring loading 34 and 35 so that, if required, the initial rotation of the input shaft 12 to manually drive the piston 3 causes sufficient axial displacement of the worm shaft 7 to operate the axial valve 21 and power the ram 28 prior to, or substantially simultaneously with, the rotary valve 10 being operated to power the servomotor formed by the piston 3 and its cylinder 2.

From the aforegoing it will be apparent that provision must be made in the structure of the steering assembly to permit the small axial displacement which is required of the worm shaft. This can easily be accomplished by mounting the shaft 7 in sliding seals and accommodating for its axial displacement (which is only likely to be in the order of thousandths of an inch) in the coupling 8 provided between the end of the worm shaft and the rotary valve sleeve 9—for example, this coupling may be in the form of co-operating splines or castellations. A notable feature of the described embodiment is the relatively simple structure required to accommodate the rotary and axially responsive valves 10 and 21 respectively and the fact that both of these valves can be of a form which is substantially conventional for power assisted steering gears.

Although the illustrated embodiment employs two independent servomotors, the piston 3 and its cylinder and the ram 28, the possibility is envisaged for the valves 10 and 21 to serve a single and common servomotor which could be either the ram 28 or the piston 3 and its cylinder (provided that such a single servomotor can withstand the maximum power to which it will be subjected from both hydraulic systems 16 and 25).

I claim:

1. A power assisted steering system comprising:
   a steering assembly for providing a steering output in response to a steering input torque;
   servomotor means for providing power assistance to the steering output;
   a first hydraulic system portion comprising a rotary valve for applying fluid pressure to the servomotor means in response to the steering input torque;
   a second hydraulic system portion independent of the first hydraulic system portion and comprising an axially responsive valve for also applying fluid pressure to the servomotor means; and
   means for coupling the axially responsive valve to the rotary valve, said coupling means comprising axially extending shaft means and spring means for biasing said shaft means to a neutral condition, said shaft means being axially displaceable against the bias of said spring means in response to a reaction imparted to said shaft means as a result of the steering input torque to actuate said axially responsive valve.

2. A system as claimed in claim 1 wherein said second hydraulic system portion applies fluid pressure to said servomotor means prior to, simultaneously with, or subsequent to application of fluid pressure to said servomotor means from said first hydraulic system portion.

3. A system as claimed in claim 1 further comprising mechanical connection means for connecting said shaft means with said servomotor means whereby said shaft means is axially displaceable to actuate said axially responsive valve in response to a reaction applied to said servomotor means when said servomotor means has fluid pressure from said first hydraulic system portions applied thereto.

4. A system as claimed in claim 1 wherein said shaft means is axially displaceable to actuate said axially responsive valve in response to operation of said rotary valve and to a reaction from a steering load resulting solely as a result of the steering input torque applied to said rotary valve.

5. A system as claimed in claim 1 wherein said rotary valve comprises a sleeve member, a rotary member mounted within said sleeve member for relative rotation with respect thereto, and means for rotationally biasing said sleeve and rotary members to a neutral condition.

6. A system as claimed in claim 1 wherein said axially responsive valve comprises a cylinder and a spool mounted in said cylinder for relative axial displacement with respect thereto, said spool being axially biased relative to said cylinder to a neutral condition by said spring means for biasing said shaft means to a neutral condition.

7. A system as claimed in claim 1 wherein said rotary valve, said axially responsive valve and said shaft means are coaxial.

8. A system as claimed in claim 1 wherein said shaft means is rotatable in response to the steering input torque applied to drive a component in said steering assembly from which component the steering output is derived, said shaft means being axially displaceable to actuate said axially responsive valve in response to a reaction resulting from resistance applied to said component.

9. A system as claimed in claim 8 wherein said shaft means comprises a worm shaft and said component comprises means which drivingly engages said worm shaft and is displaced axially in response to rotation of said worm shaft, said means which drivingly engages said worm shaft comprises a double acting piston movable in a cylinder, which piston and cylinder form part of said servomotor means.

10. A system as claimed in claim 9 wherein said rotary valve, said axially responsive valve, and said shaft means are coaxial, and wherein one end of said worm shaft is coupled to said rotary valve for rotation therewith and the other end is coupled to said axially responsive valve.

11. A system as claimed in claim 9 wherein said servomotor means comprises a first servomotor actuated by said first hydraulic system portion and a second servomotor, independent of the first servomotor, actuated by said second hydraulic system portion and wherein the first servomotor comprises said piston and said cylinder.

12. A system as claimed in claim 1 wherein said servomotor means comprises a first servomotor actuated by said first hydraulic system portion and a second servomotor, independent of the first servomotor, actuated by said second hydraulic system portion.

13. A system as claimed in claim 1 wherein said steering assembly comprises a housing and said spring means biases said shaft means relative to said housing, said spring means comprising axially opposed springs encircling said shaft means.

14. A steering assembly for a power assisted steering system as claimed in claim 1 further comprising a housing in which said rotary and axially responsive valves, and said axially extending shaft means are mounted, said shaft means being axially displaceable and axially spring biased relative to said housing to a neutral condition, said shaft means being axially displaceable in response to an axial reaction applied thereto.

* * * * *